United States Patent [19]
Ensch et al.

[11] Patent Number: 5,779,027
[45] Date of Patent: Jul. 14, 1998

[54] SIDEFLEXING CONVEYOR INCLUDING LUBRICATION INSERTS

[75] Inventors: Peter J. Ensch, Wauwatosa; Louis F. Counter, Greendale, both of Wis.

[73] Assignee: Rexnord Corporation, Milwaukee, Wis.

[21] Appl. No.: 599,996

[22] Filed: Feb. 14, 1996

[51] Int. Cl.6 .................................................. B65G 15/62
[52] U.S. Cl. ............................................................. 198/841
[58] Field of Search ........................... 198/831, 839, 198/840, 841, 850

[56] References Cited

U.S. PATENT DOCUMENTS

| | | | |
|---|---|---|---|
| 3,788,455 | 1/1974 | Dieckmann, Jr. | 198/831 |
| 3,944,059 | 3/1976 | Garvey | 198/189 |
| 4,951,809 | 8/1990 | Bootre et al. | 198/841 |
| 4,961,492 | 10/1990 | Wiseman et al. | 198/841 |
| 5,031,757 | 7/1991 | Draebel et al. | 198/841 X |
| 5,176,247 | 1/1993 | Counter et al. | 198/831 |
| 5,454,467 | 10/1995 | Lago | 198/841 X |
| 5,586,644 | 12/1996 | Coen et al. | 198/850 X |

FOREIGN PATENT DOCUMENTS

| | | |
|---|---|---|
| 2306973 | 8/1973 | Germany. |
| 2008523 | 6/1979 | United Kingdom. |

*Primary Examiner*—James R. Bidwell
*Attorney, Agent, or Firm*—Michael, Best & Friedrich

[57] ABSTRACT

A conveyor including: a guide track including a wear strip, the wear strip including a guide surface; a conveyor chain supported for movement relative to the guide track and including a plurality of interconnected links, a plurality of the links each including a thrust surface which rides against the guide surface when the conveyor chain is moved; and a lubrication insert mounted in one of the wear strip and the plurality of links, the lubrication insert including a porous material having an outer portion proximate one of the guide surface and the thrust surface, the lubrication insert including a fluid lubricant impregnating the porous material, such that when the conveyor chain is moved the fluid lubricant is released from the porous material and forms a lubricating film between the guide surface and the thrust surface.

40 Claims, 3 Drawing Sheets

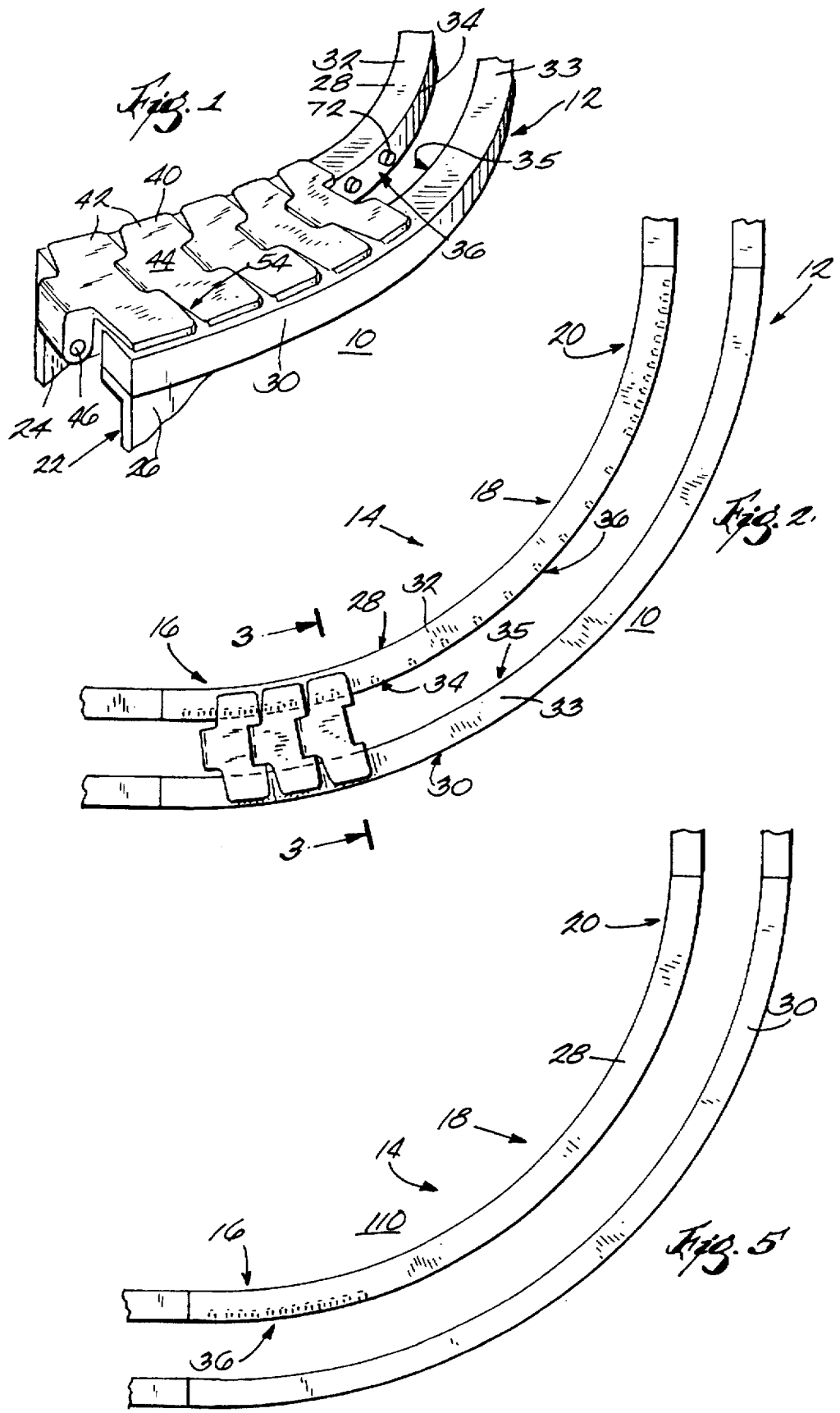

SIDEFLEXING CONVEYOR INCLUDING LUBRICATION INSERTS

BACKGROUND OF THE INVENTION

1. Field of the Invention

The present invention relates generally to conveyors. More particularly, the invention relates to a sideflexing conveyor including lubrication inserts.

2. Reference to Prior Art

As shown in U.S. Pat. No. 5,176,247, a sideflexing conveyor includes a guide track having a pair of spaced wear strips which define straight and curved sections. An endless sideflexing conveyor chain i.e., which is flexible in the horizontal or lateral direction as well as in the vertical direction) traverses the guide track. A drive sprocket pulls the conveyor chain around the guide track. When pulled through a curved section, the conveyor chain rides against the inner wear strip of the guide track, creating frictional forces which can cause overheating and wear of the guide track and chain.

A problem in prior art sideflexing conveyors is that, in many applications, it is necessary to provide one or more separate mechanisms for lubricating the conveyor chain at the curved sections. The lubricating mechanisms have moving parts which must be maintained. The lubricating mechanisms also release relatively large amounts of a fluid lubricant which must be replenished.

Another problem is that in many applications it is undesirable to provide a separate mechanism for lubricating the conveyor chain, and as a result the conveyor chain and guide track are not lubricated and wear quickly. This is a particular problem in many food processing applications, because the conveyor must meet stringent requirements in order to avoid the possibility of contaminating the food being handled.

SUMMARY OF THE INVENTION

The invention provides a conveyor, such as a sideflexing conveyor, including a guide track and a conveyor chain which traverses the guide track. The guide track includes spaced inner and outer wear strips. The guide surface of the inner wear strip defines the inside and the guide surface of the outer wear strip defines the outside of an arcuate path in each curved section of the guide track. The guide surface of the inner wear strip includes a plurality of longitudinally spaced holes housing lubrication inserts. The conveyor chain is formed of a plurality of interconnected links each having a top plate and inner and outer ribs which extend downwardly from the top plate. The outer surface of the inner rib forms a thrust surface which rides against the guide surface of the inner wear strip when the conveyor chain is pulled through a curved section of the guide track.

The lubrication inserts are mounted in the holes of the inner wear strip. In one embodiment, each lubrication insert includes a cylindrical plug of porous material which includes a great number of elongate voids and a fluid lubricant contained in the voids of the porous material. In one embodiment, the porous material is a high density polymeric material, such as polyethylene. In one embodiment, the fluid lubricant is petroleum based oil. In another embodiment, the fluid lubricant is food grade vegetable oil.

In operation, as links of the chain move through the curved section of the guide track, tension in the chain causes the outer surface of the inner rib of each link to form a thrust surface which rides against the guide surface of the inner wear strip. Continuing movement of the chain creates frictional forces which generate heat and cause heating of the inner wear strip including the lubrication inserts. When heated, the lubrication inserts release small amounts of the fluid lubricant from the voids of the porous material by capillary action. The fluid lubricant forms a thin lubricating film between the guide surface of the inner wear strip and the thrust surfaces of the links. The lubricating effect lasts until the film dissipates, and frictional forces again cause heating of the lubrication inserts and the further release of small amounts of the fluid lubricant to renew the lubricating film.

In one embodiment of the invention, the lubrication inserts are located only in the entrance portion of each curved section of the guide track. In one embodiment, the lubricating inserts are located in holes in the chain links. In one embodiment, the chain links are integrally formed of the porous material and a second polymeric material. In one embodiment, the entire inner wear strip is formed of the porous material.

In one embodiment of the invention, each lubrication insert includes a cylindrical plug of solid low friction material and a binder material. A suitable solid low friction material is PTFE, and a suitable binder material is polyethylene. The plug is soft and mechanically deforms upon contact with the chain, such that particles of the PTFE are released or smeared onto the thrust surface and guide surface. In one embodiment, the plug including solid low friction material is substantially nonporous and contains no fluid lubricant. In another embodiment, the plug including solid low friction material is porous and contains a fluid lubricant which is also released to lubricate the thrust surface and guide surface.

It is advantageous that the invention lubricates the guide track and chain and thus prevents overheating and resultant malfunctions of the conveyor. The invention also prevents undue wear of the conveyor and thus increases the life of the conveyor. The invention also provides such lubrication for the guide track and chain in a relatively inexpensive manner, because a separate mechanical lubrication mechanism is not required, and also because only a small amount of the relatively expensive lubrication material is required in construction of the guide track and chain.

Other features and advantages of the invention will become apparent to those skilled in the art upon review of the following detailed description, claims and drawing.

BRIEF DISCUSSION OF THE DRAWINGS

FIG. 1 is a perspective view showing a conveyor of the invention.

FIG. 2 is a top plan view of the conveyor shown in FIG. 1.

FIG. 5 is a top plan view similar to FIG. 2 and showing a conveyor 110 which is an alternative embodiment of the invention.

DETAILED DESCRIPTION OF A PREFERRED EMBODIMENT

Figure 3:
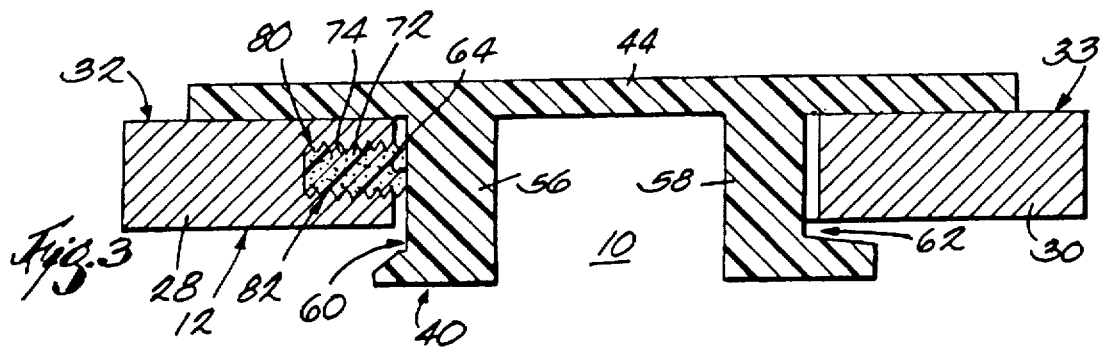
FIG. 3 is an enlarged cross sectional view taken generally along line 3—3 in FIG. 2.

Illustrated in FIGS. 1–4 is a conveyor 10 embodying various features of the invention. In the illustrated embodiment, the conveyor 10 is a sideflexing conveyor. The sideflexing conveyor 10 includes a continuous guide track 12 having straight sections (not shown) and corner or curved sections 14 (one shown). As best shown in FIG. 2, the curved section 14 has an entrance portion 16, a central portion 18 and an exit portion 20. The conveyor chain (described below) initially enters the entrance portion 16, travels through the central portion 18, and thereafter exits from the exit portion 20 of the curved section 14.

The guide track 12 includes a suitable support structure 22 for supporting the guide track 12 above the floor. In the illustrated embodiment, the support structure 22 includes a pair of spaced, parallel inner and outer carrying ways 24 and 26. Each of the inner and outer carrying ways 24 and 26 has a generally horizontal upper mounting surface. The guide track 12 also includes inner and outer wear strips 28 and 30 mounted on the respective inner and outer carrying ways 24 and 26. As should be apparent from FIGS. 1 and 2, the inner and outer wear strips 28 and 30 are identified with reference to their relative positions in the curved section 14 (i.e., the inner wear strip 28 occupies the inner position relative to the outer wear strip 30 and the center of the arc of the curved section 12, and the outer wear strip 30 occupies the outer position relative to the inner wear strip 28 and the center of the arc of the curved section 14). It should be apparent that, although the guide track as illustrated includes two separate inner and outer wear strips, in one embodiment (not shown), the inner and outer wear strips may be portions of a single base member having a U-shaped or other suitable cross-sectional profile. It should also be apparent that, in other embodiments (not shown), a different number of wear strips or wear strips having different cross-sectional configurations, can be used.

Returning to the illustrated embodiment, each of the inner and outer wear strips 28 and 30 includes a respective horizontal carrying surface 32 or 33 and a respective generally vertical guide surface 34 or 35. The guide surface 34 of the inner wear strip 28 defines the inside and the guide surface 35 of the outer wear strip 30 defines the outside of an arcuate path in the curved section 14. It should be apparent that in another embodiment (not shown), the guide surfaces along the arcuate path can be defined differently in relation to the wear strips, or a different number of guide surfaces can be defined. The guide surface 34 of the inner wear strip 28 has therein a plurality of identical, longitudinally spaced holes 36. In the illustrated embodiment, each of the holes 36 includes a continuous sidewall having internal threads 38. In another embodiment, the holes are not threaded. The size and spacing of the holes will vary according to the size and specific geometric configuration of the guide track, chain and curved section. In the specific embodiment illustrated, each hole 36 has a diameter of about 5/32 inch and a depth of about 1/4 inch. As best shown in FIG. 2, in the entrance portion 16 and the exit portion 20, the holes 36 are spaced closer together than in the central portion 18. In the specific embodiment illustrated, the holes 36 in the central portion 18 are spaced about twice as far apart (about 1.5 inches from center to center) as those in the entrance portion 16 and the exit portion 20. In other embodiments, the holes 36 can be spaced differently. In the illustrated embodiment, the inner and outer wear strips 28 and 30 consist of low friction UHMWPE material. In other embodiments, the wear strips can consist of another suitable material such as, for example, nylon or steel.

The conveyor 10 includes an endless conveyor chain 40 which is supported for traversing movement relative to the guide track 12. In the specific embodiment illustrated, the conveyor chain 40 is sideflexing (i.e., flexes in the horizontal or lateral direction as well as in the vertical direction) in order to negotiate the curved sections 14 of the guide track 12. The conveyor chain 40 is formed of a plurality of interconnected, identical links 42. In the illustrated embodiment, each of the links 42 consists of low friction acetal thermoplastic material. In other embodiments, the links can consist of different suitable material, such as steel. Each of the links 42 includes a generally planar top plate 44 having a center hinge eye 46 at its trailing end and a pair of complementary hinge eyes (not shown) at its leading end. The leading end of each link 42 is pivotally connected to the trailing end of an adjacent leading link by a first hinge pin (not shown). The trailing end of each link is pivotally connected to the leading end of an adjacent trailing link by a second hinge pin (not shown). The trailing edges 54 of the links 42 are beveled to permit relative pivotal movement or sideflexing in the horizontal direction.

Each link 42 also includes spaced inner and outer ribs 56 and 58 extending downwardly from the top plate 44. Each of the inner and outer ribs 56 and 58 has a respective vertical outer surface 60 or 62. The outer surfaces 60 and 62 of the inner and outer ribs 56 and 58 oppose the respective guide surfaces 34 and 35 of the inner and outer wear strips 28 and 30. When the conveyor chain 40 is pulled through the curved section 14 of the guide track 12, tension in the conveyor chain 40 causes the outer surface 60 of the inner rib 56 to be forced or drawn against the guide surface 34 of the inner wear strip 28, such that the outer surface 60 of the inner rib 56 forms a thrust surface 64 which rides against and thus applies force against the guide surface 34 of the inner wear strip 28.

The conveyor 10 is connected to suitable means (not shown) for driving the conveyor chain 40. In the illustrated embodiment, the means for driving the conveyor chain includes a suitable motor which is drivingly connected to a drive sprocket. The teeth of the drive sprocket engage the conveyor chain 40 and thus pull the conveyor chain relative to the guide track 12. Since the conveyor chain 40 is pulled relative to the guide track 12 by operation of the drive sprocket, tension is caused in the conveyor chain 40.

The conveyor 10 includes a plurality of lubrication inserts 72 mounted in the holes 36 of the inner wear strip 28. Each of the lubrication inserts 72 includes a cylindrical plug 74. In another embodiment (not shown), the plug can have another suitable cross-sectional shape. The plug 74 has external threads 76 for mating engagement with the internal threads 38 of the respective hole 36. In the illustrated embodiment, the plug 74 has a diameter of about 5/32 inch. The plug 74 has an outer portion proximate the guide surface 34 and the opposed thrust surface 64. In the illustrated embodiment, the outer portion is raised slightly relative to the guide surface 34 (the raising of the outer portion is exaggerated for clarity) and abuts the thrust surface 64 when the conveyor chain 40 moves through the curved section 14, as further described below. In other embodiments (not shown), the outer portion of the plug is not raised relative to the guide surface.

In the illustrated embodiment, the plug 74 consists of porous material 80 which defines a great number of elongate voids. The voids having a relatively high aspect ratio, such as, for example, at least about 2. In one embodiment, the porous material 80 is a high density polymeric material. In one embodiment, the polymeric material is polyethylene. Although high density polyethylene is presently preferred, the polyethylene of other polymeric material may be of any suitable density. A suitable commercially available porous material is Micropoly™ H-2 (Phymet Inc.; Springborough, Ohio). Although the plugs 74 can be formed in any suitable manner, in the illustrated embodiment the porous material 80 is extruded in the form of rods which are then cut to length to form the plugs 74.

In the illustrated embodiment, the lubrication inserts 72 include a fluid lubricant 82 contained in the voids of the porous material 80. Any suitable fluid lubricant can be used. In one embodiment, the fluid lubricant 82 is selected from the group consisting of: petroleum based oils, food grade vegetable oils, synthetic lubricants and combinations thereof. In one embodiment, wherein the conveyor is suitable for use in food processing applications, the fluid lubricant 82 is type H-2 food grade vegetable oil. A suitable commercially available fluid lubricant is the type H-2 food grade vegetable oil provided in Micropoly™ H-2 (Phymet Inc.; Springborough, Ohio). Micropoly™ H-2 is a commercially available product including a rod of porous polyethylene which is impregnated with type H-2 food grade vegetable oil. The fluid lubricant can be introduced into the porous material in any suitable manner, such as by vacuum impregnation.

In operation of the conveyor 10, the drive sprocket pulls the chain 40 relative to the guide track 12, such that the chain 40 traverses the guide track 12. As links 42 of the chain 40 move through the curved section 14 of the guide track 12, tension in the chain 40 causes the outer surface 60 of the inner rib 56 of each link 42 to be drawn or forced against the guide surface 34 of the inner wear strip 28. The outer surface 60 of the inner rib 56 thus forms a thrust surface 64 which rides against the guide surface 34 of the inner wear strip 28. Continuing movement of the chain 40 relative to the guide track 12 creates frictional forces between the guide surface 34 of the inner wear strip 28 and the thrust surface 64. These frictional forces generate heat and thus cause heating of the lubrication inserts 72. Upon heating of the lubrication inserts 72, small amounts of the fluid lubricant 82 are released from the voids of the porous material 80 by capillary action. This capillary action is caused by thermally-induced expansion of the fluid lubricant 82 in the voids of the porous material 80. The elongated shape of the voids in the porous material 80 maximizes the amount of the fluid lubricant 82 which is released. The released fluid lubricant 82 forms a thin lubricating film between the guide surface 34 of the inner wear strip 28 and the thrust surfaces 64 of the links 42. The lubricating film minimizes frictional forces between the guide surface 34 and the thrust surfaces 64. This lubricating effect lasts until the film dissipates, and frictional forces again cause heating of the lubrication inserts 72 and further release of small amounts of the fluid lubricant 82 to renew the lubricating film. In this aspect, the lubrication inserts are "self-regulating", because minute amounts of the fluid lubricant 82 are released when frictional forces generate sufficient heat to warm the lubrication inserts 72.

It is an advantage of the invention that it is unnecessary to provide separate mechanisms for lubricating the conveyor chain at curved sections. It is another advantage that only a relatively small amount of the lubrication material is required for construction of the conveyor. It is a further advantage that the lubrication inserts are self-regulating, in that limited amounts of the fluid lubricant are released when frictional forces generate sufficient heat to warm the lubrication inserts. It is a further advantage that the lubrication inserts have no moving parts and are maintenance free. It is another advantage that the lubrication inserts release vastly smaller amounts of fluid lubricant than do separate lubricating mechanisms.

Illustrated in FIG. 5 is a conveyor 110 which is an alternative embodiment of the invention. Except as otherwise described, the conveyor 110 is identical to the conveyor 10, and common elements are identified by the same reference numerals. The conveyor 110 includes longitudinally spaced holes 36 and corresponding lubrication inserts 72 which are located in the inner wear strip 28 only in the entrance portion 16 of the curved section 14. The lubrication inserts 72 in the entrance portion 16 provide a lubricating film which is carried into the central portion 18 and the exit portion 20 of the curved section 14 by movement of the chain 40 therethrough.

Figure 6:
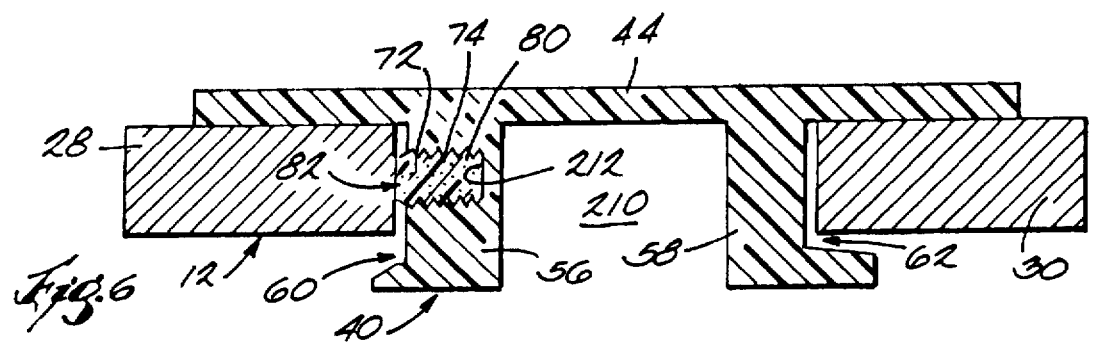
FIG. 6 is a cross sectional view similar to FIG. 3 and showing a conveyor 210 which is a second alternative embodiment of the invention.

Illustrated in FIG. 6 is a conveyor 210 which is a second alternative embodiment of the invention. Except as otherwise described, the conveyor 210 is identical to the conveyor 10, and common elements are identified by the same reference numerals. The inner rib 56 of each link 42 (one shown) has therein a hole 212 in which a lubrication insert 72 is mounted. The inner wear strip 28 does not have holes or lubrication inserts mounted therein.

Figure 7:
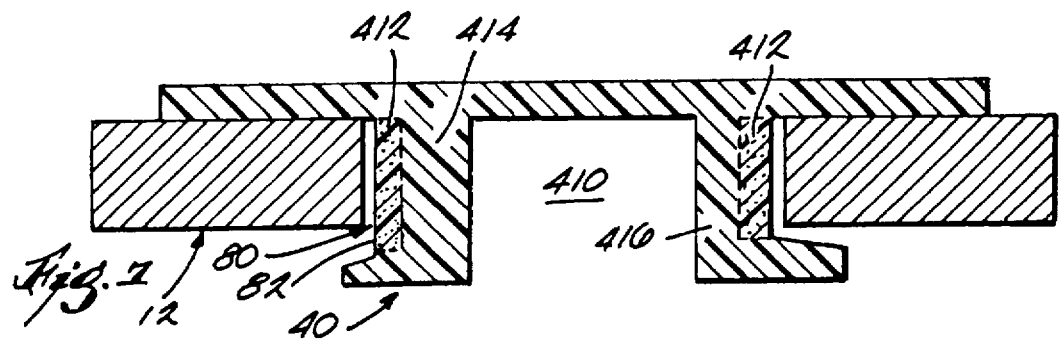
FIG. 7 is a cross sectional view similar to FIG. 3 and showing a conveyor 410 which is a third alternative embodiment of the invention.
Figure 4:
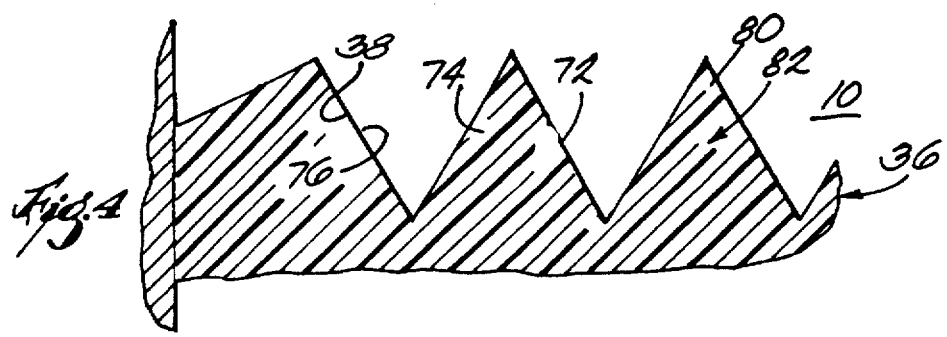
FIG. 4 is a much enlarged view of a portion of the conveyor shown in FIG. 3.

Illustrated in FIG. 7 is a conveyor 410 which is a third alternative embodiment of the invention. Except as otherwise described, the conveyor 410 is identical to the conveyor 10, and common elements are identified by the same reference numerals. Each link 42 (one shown) has a first portion 412 consisting of the porous material 80 and a second portion 414 consisting of a second polymeric material 416. The first and second portions 412 and 414 are integrally joined or integrally formed in a suitable manner. For example, in the illustrated embodiment, the link 42 is formed by coinjection of the porous material 80 with the second polymeric material 416. The second polymeric material 416 can be any suitable material providing sufficient structural integrity for the link 42. In the specific embodiment illustrated, the second polymeric material 416 is low friction UHMWPE or nylon material.

Figure 8:
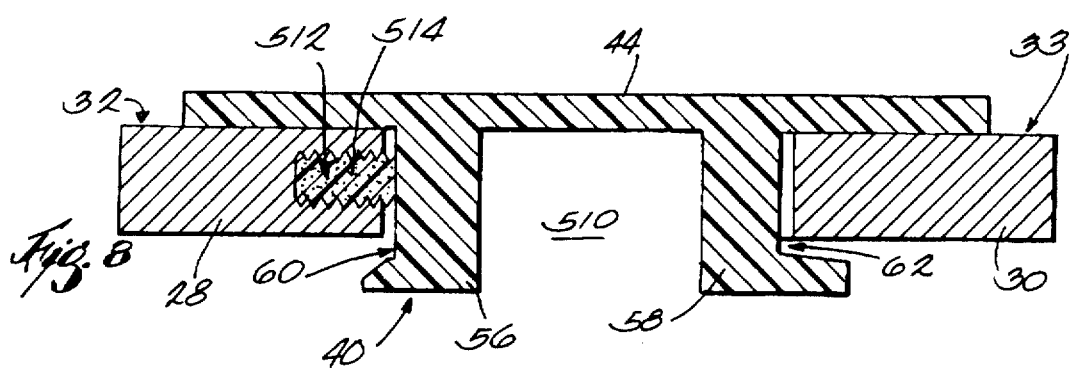
FIG. 8 is a cross sectional view similar to FIG. 3 and showing a conveyor 510 which is a fourth alternative embodiment of the invention.

Illustrated in FIG. 8 is a conveyor 510 which is a fourth alternative embodiment of the invention. Except as otherwise described, the conveyor 510 is identical to the conveyor 10, and the same reference numbers are used to identify identical elements. It should be understood that a conveyor according to this embodiment can also be arranged differently from the conveyor 10, and can instead have the same general appearance as any of the illustrated conveyors 110, 210 or 410. The conveyor 510 includes lubrication inserts 512 which are of different construction than the lubrication inserts 74 of the conveyor 10. The lubrication inserts 512 include a plug 514 formed of a solid low friction material and a binder material. Any suitable solid low friction material may be used. Suitable solid low friction materials can include, for example, fluorocarbon polymers or a combination of fluorocarbon polymers. In the illustrated embodiment, the solid low friction material is PTFE. Other suitable low friction materials are, for example, $MoS_2$ and stearates. The plugs 514 also include a suitable binder material for forming the PTFE into the shape of a plug. Any suitable binder material may be used. In the illustrated embodiment, the binder material is polyethylene. More particularly, although the relative amounts of the low friction material and binder material can vary over a broad range, in the illustrated embodiment, the plugs 514 include about 80% of PTFE and about 20% of polyethylene. The plugs 514 including the low friction material are relatively soft in comparison to the hard materials, such as UHMWPE, nylon or steel, forming the guide surface of the inner wear strip and the thrust surface of the chain. In operation of the conveyor 510, the thrust surface of the chain bears against the guide surface of the inner wear strip and against the plugs 514, causing mechanical deformation of the relatively soft plugs 514. As a result of this mechanical deformation, of the plugs 514, particles of the PTFE are smeared onto the thrust surface of the chain and thus also onto the guide surface of the inner wear strip to lubricate the conveyor. Upon continued operation of the conveyor, the plugs 514 will wear away and must be periodically replaced.

Figure 9:
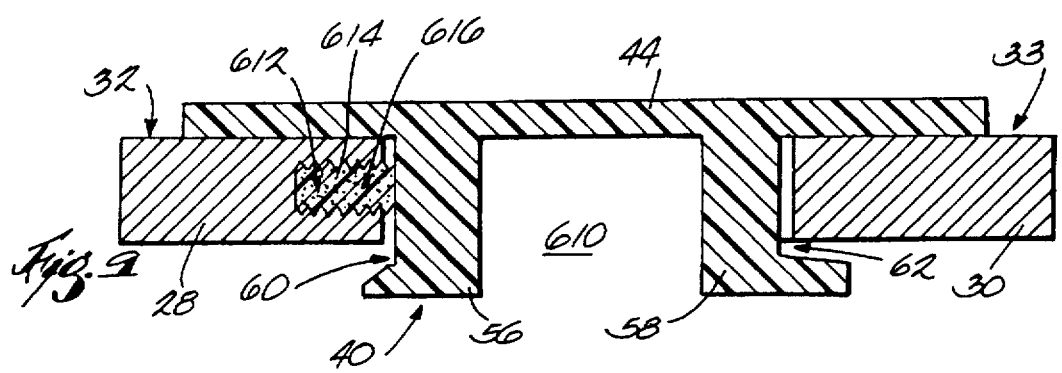
FIG. 9 is a cross sectional view similar to FIG. 8 and showing a conveyor 610 which is a fifth alternative embodiment of the invention.

Illustrated in FIG. 9 is a conveyor 610 which is a fifth alternative embodiment of the invention. Except as otherwise described, the conveyor 610 is identical to the conveyor 510, and the same reference numbers are used to identify identical elements. The conveyor 610 includes lubrication inserts 612 which are of different construction than the lubrication inserts 512 of the conveyor 510. The lubrication inserts 612 include a plug 614 formed of a solid low friction material and a binder material. As described for the plugs 514 in the conveyor 510, any suitable solid low friction material and suitable binder material may be used. In the illustrated embodiment, the plug 614 includes about 80% PTFE (solid low friction material) and about 20% polyethylene (binder material). Unlike the plugs 514, the plugs 614 are porous and thus have therein voids containing a fluid lubricant 616. Any suitable fluid lubricant, such as any of the previously described fluid lubricants, may be used. In the illustrated embodiment, the fluid lubricant 616 is a suitable petroleum-based lubricating oil. The plugs 614 including the low friction material are relatively soft in comparison to the hard materials forming the guide surface of the inner wear strip and the thrust surface of the chain. In operation of the conveyor 510 the thrust surface of the chain bear against and cause mechanical deformation of the soft plugs 614. As a result, particles of the PTFE are smeared onto the thrust surface of the chain and onto the guide surface of the inner wear strip to lubricate the conveyor. Upon continued operation of the conveyor, the plugs 614 will wear away and must be periodically replaced. Also, upon heating of the inner wear strip by frictional forces, the fluid lubricant 616 will be released and will form a thin lubricating layer between the thrust surface and guide surface. The combination of the soft plug 614 including the solid low friction material and the fluid lubricant 616 contained therein is advantageous, because the solid low friction material provides especially effective lubrication of the conveyor when operating at low speed, high loading conditions, and the fluid lubricant provides especially effective lubrication of the conveyor when operating at high speed, low loading conditions.

What is claimed is:

1. A conveyor comprising: a guide track including a wear strip including a guide surface; a conveyor chain supported for movement relative to said guide track and including a plurality of interconnected links each including a surface which rides adjacent said guide surface when said conveyor chain is moved; and a plurality of lubrication inserts mounted in spaced relation to one another and in one of said wear strip and said plurality of said links and including a porous material having an outer portion proximate one of said guide surface and said surface of said interconnected links and a fluid lubricant impregnating said porous material such that when said conveyor chain is moved said fluid lubricant is released from said porous material and forms a lubricating film between said guide surface and said lubrication inserts.

2. A conveyor as set forth in claim 1 and wherein one of said wear strip and said plurality of said links includes a hole, said lubrication insert being mounted in said hole.

3. A conveyor as set forth in claim 1 and wherein said porous material defines a plurality of voids containing fluid lubricant, and movement of said conveyor chain causes said lubrication insert to become heated and to release said fluid lubricant from said porous material by capillary action.

4. A conveyor as set forth in claim 3 and wherein said porous material is a high density polymeric material.

5. A conveyor as set forth in claim 4 and wherein said polymeric material is polyethylene.

6. A conveyor as set forth in claim 4 and wherein said porous material further includes a low friction fluorocarbon polymer.

7. A conveyor as set forth in claim 3 and wherein said porous material contains PTFE.

8. A conveyor as set forth in claim 1 and wherein said fluid lubricant is selected from the group consisting of petroleum based oils, food grade vegetable oils, and synthetic lubricants.

9. A conveyor comprising: a guide track including spaced inner and outer wear strips defining a curved section, said inner wear strip including a guide surface; a sideflexing conveyor chain which is supported for movement relative to said guide track and through said curved section and which includes a plurality of interconnected links each including a thrust surface which rides adjacent said guide surface of said inner wear strip when said sideflexing conveyor chain is moved through said curved section; and a plurality of lubrication inserts which are mounted in spaced relation to one another and in one of said inner wear strip and said plurality of said links and which respectively include a porous material having an outer portion proximate one of said guide surface of said inner wear strip and said thrust surface and a fluid lubricant impregnating said porous material such that when said sideflexing conveyor chain is moved said fluid lubricant is released from said porous material and forms a lubricating film between said guide surface of said inner wear strip and said lubrication inserts.

10. A conveyor as set forth in claim 9 and wherein one of said inner wear strip and said plurality of said links includes a hole, said lubrication insert being mounted in said hole.

11. A conveyor as set forth in claim 9 and wherein said porous material defines a plurality of voids containing said fluid lubricant, and movement of said sideflexing conveyor chain causes said lubrication insert to become heated and to release said fluid lubricant from said porous material by capillary action.

12. A conveyor as set forth in claim 11 and wherein said porous material is a high density polymeric material.

13. A conveyor as set forth in claim 12 and wherein said polymeric material is polyethylene.

14. A conveyor as set forth in claim 12 and wherein said porous material further includes a fluorocarbon polymer.

15. A conveyor as set forth in claim 11 and wherein said porous material contains PTFE.

16. A conveyor as set forth in claim 9 and wherein said fluid lubricant is selected from the group consisting of petroleum based oils, food grade vegetable oils, and synthetic lubricants.

17. A conveyor comprising a guide track including an outer wear strip and an inner wear strip spaced from said outer wear strip, including a guide surface having therein a hole, and defining, with said outer wear strip, a curved section including an entry portion having therein said hole in said guide surface, and a sideflexing conveyor chain supported for movement relative to said guide track, through said curved section, and including a plurality of interconnected links entering said entry portion when said sideflexing conveyor chain is moved and each including a thrust surface which rides adjacent said guide surface of said inner wear strip when said sideflexing conveyor chain is moved through said curved section; and a lubrication insert mounted in said hole and including a porous material having an outer portion proximate said thrust surface, and a fluid lubricant impregnating said porous material such that, when said sideflexing conveyor chain is moved, said fluid lubricant is released from said porous material and forms a lubricating film between said guide surface of said inner wear strip and said outer portion of said lubrication insert.

18. A conveyor comprising:
a guide track including an inner wear strip defining a curved section, said inner wear strip including a guide surface having therein a plurality of longitudinally spaced holes;
a sideflexing conveyor chain supported for movement relative to said guide track and through said curved section, said sideflexing conveyor chain including a plurality of interconnected links, a plurality of said links each including a surface which rides adjacent said guide surface of said inner wear strip when said sideflexing conveyor chain is moved through said curved section; and
a plurality of lubrication inserts mounted in said holes, said lubrication inserts including a porous material having an outer portion proximate said thrust surface, said lubrication inserts including a fluid lubricant impregnating said porous material, such that when said sideflexing conveyor chain is moved said fluid lubricant is released from said porous material and forms a lubricating film between said guide surface of said inner wear strip and said thrust surface.

19. A conveyor as set forth in claim 18 and wherein said porous material defines a plurality of voids containing said fluid lubricant, and movement of said sideflexing conveyor chain causes said lubrication insert to become heated and to release said fluid lubricant from said porous material by capillary action.

20. A conveyor as set forth in claim 19 and wherein said porous material is a high density polymeric material.

21. A conveyor as set forth in claim 20 and wherein said polymeric material is polyethylene.

22. A conveyor as set forth in claim 19 and wherein said porous material further includes a fluorocarbon polymer.

23. A conveyor as set forth in claim 19 and wherein said porous material contains PTFE.

24. A conveyor as set forth in claim 18 and wherein said fluid lubricant is selected from the group consisting of petroleum based oils, food grade vegetable oils, and synthetic lubricants.

25. A conveyor as set forth in claim 18 and wherein said curved section includes an entry portion and an exit portion, said links entering said entry portion and thereafter exiting from said exit portion when said sideflexing conveyor chain is moved, and said holes being located in said entry portion.

26. A conveyor comprising: a guide track including a curved section defined by an outer wear strip, and an inner wear strip spaced from said outer wear strip and including a guide surface; and a sideflexing conveyor chain supported for movement relative to said guide track and through said curved section and comprising a plurality of interconnected links respectively including a surface which travels adjacent said guide surface of said inner wear strip when said sideflexing conveyor chain is moved through said curved section and which respectively include a hole, and a plurality of lubrication inserts which are respectively mounted in said holes, which ride against said guide surface of said inner wear strip when said sideflexing conveyor chain is moved through said curved section, and which include a porous material, and a fluid lubricant impregnating said porous material, such that when said sideflexing conveyor chain is moved said fluid lubricant is released from said porous material and forms a lubricating film between said guide surface of said inner wear strip and said lubrication inserts.

27. A conveyor as set forth in claim 26 and wherein said porous material defines a plurality of voids containing said fluid lubricant, and movement of said conveyor chain causes said lubrication insert to become heated and to release said fluid lubricant from said porous material by capillary action.

28. A conveyor as set forth in claim 27 and wherein said porous material is a high density polymeric material.

29. A conveyor as set forth in claim 28 and wherein said polymeric material is polyethylene.

30. A conveyor as set forth in claim 27 and wherein said porous material further includes a fluorocarbon polymer.

31. A conveyor as set forth in claim 26 and wherein said porous material contains PTFE.

32. A conveyor as set forth in claim 26 and wherein said fluid lubricant is selected from the group consisting of petroleum based oils, food grade vegetable oils, and synthetic lubricants.

33. A conveyor comprising:
a guide track including a wear strip, said wear strip including a guide surface;
a conveyor chain supported for movement relative to said guide track and including a plurality of interconnected links, a plurality of said links each including a thrust surface which rides against said guide surface when said conveyor chain is moved; and
a lubrication insert mounted in one of said wear strip and said plurality of said links, said lubrication insert including a solid low friction material and a binder material for binding the solid low friction material to form a deformable plug, the plug having an outer portion proximate one of said guide surface and said thrust surface, such that when the conveyor chain is moved particles of the solid low friction material are released from the plug and form a lubricating layer between said guide surface and said thrust surface.

34. A conveyor as set forth in claim 33 and wherein one of said wear strip and said plurality of said links includes a hole, said lubrication insert being mounted in said hole.

35. A conveyor as set forth in claim 33 and wherein movement of said conveyor chain causes said plug to be mechanically deformed and causes said particles of the solid low friction lubricant to be released from the plug.

36. A conveyor as set forth in claim 33 and wherein said solid low friction material includes a fluorocarbon polymer.

37. A conveyor as set forth in claim 36 and wherein the solid low friction material contains PTFE.

38. A conveyor as set forth in claim 33 and wherein said binder material is polyethylene.

39. A conveyor as set forth in claim 33 and wherein said lubrication insert further includes a fluid lubricant contained in the plug.

40. A conveyor as set forth in claim 39 and wherein said fluid lubricant is selected from the group consisting of petroleum based oils, food grade vegetable oils, and synthetic lubricants.

* * * * *